June 29, 1965      W. H. SWINDALL      3,192,359

HEATER FOR FROZEN AUTOMOBILE LOCKS

Filed March 29, 1963      2 Sheets-Sheet 1

William H. Swindall
INVENTOR.

June 29, 1965 W. H. SWINDALL 3,192,359
HEATER FOR FROZEN AUTOMOBILE LOCKS
Filed March 29, 1963 2 Sheets-Sheet 2

William H. Swindall
INVENTOR.

United States Patent Office 3,192,359
Patented June 29, 1965

3,192,359
HEATER FOR FROZEN AUTOMOBILE LOCKS
William H. Swindall, Rte. 1, % R. J. Rushing,
Jackson, Tenn.
Filed Mar. 29, 1963, Ser. No. 268,868
6 Claims. (Cl. 219—201)

This invention relates to a heater for automobile locks which may be permanently installed within the body of the automobile adjacent one of the door locks thereof.

It is a primary object of this invention to provide a heater for frozen automobile locks which may be manually operated by equipment disposed beneath the hood of the automobile or may be rendered automatically operative upon the lowering of the temperature beyond a specific reference temperature.

A further object of this invention resides in the circuitry to operate said heater which may be attached to one of the inidicating lights on the dashboard of the automobile to indicate whether the heating element is operative or not.

A still further object of this invention resides in the novel support structure for the heater element and its mode of attachment adjacent the automobile lock which is to be heated.

Yet another object of this invention resides in its simplicity of construction and in its durability and efficiency of operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 4:
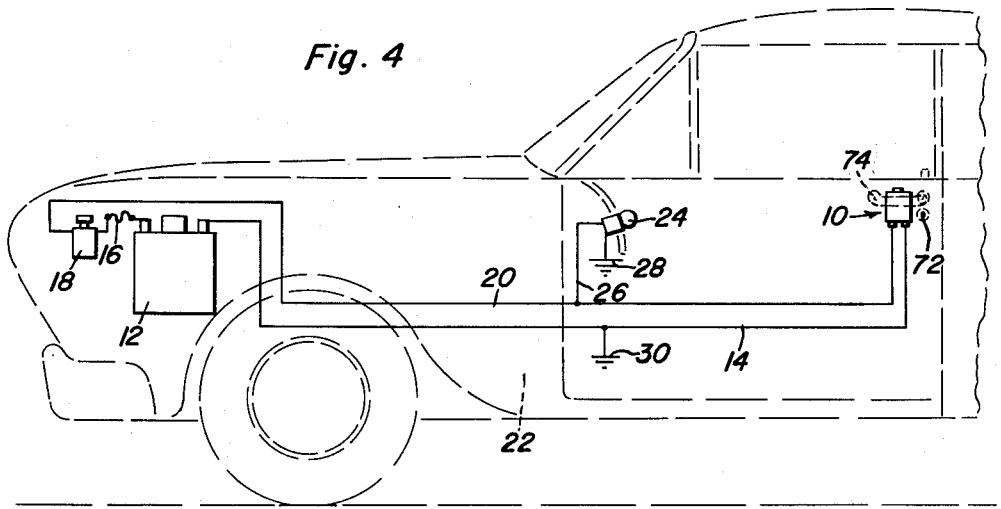
FIGURE 4 represents a schematic diagram of a portion of an automotive vehicle and of the circuitry for actuating the heating element of the instant invention and further shows the connection of the circuitry to a signal light placed on the dashboard of the automobile.

Referring now to the drawings in detail, and more particularly to FIGURE 4 wherein a schematic layout of the heater circuitry is illustrated, it will be appreciated that the heater and its supporting structure generally designated by the numeral 10 is adapted to be connected to the battery terminals of an ordinary 6 or 12 volt car battery 12. A conductor 14 leads from one of the terminals of the heater element to one of the battery terminals as illustrated. Another battery terminal is connected through a fuse 16, a switch 18 and a second conductor 20 to the other terminal of the heater element. It should be appreciated that the switch element 18 may either be of the manually operated type so that upon raising of the hood and depressing a plunger associated therewith the circuit will be caused to close through the heating element thereby heating the lock to unfreeze the same. Alternatively, the switch element 18 may be thermostatically controlled to close and open above a predetermined reference temperature whereby the heating element will be activated upon the outside temperature falling below a predetermined limit. To enable the operator of the motor vehicle 22 to have a visual indication of whether the heating element has been activated or not a suitable light 24 is mounted on the dash panel of the automobile and is connected to the conductor 20 by means of a conductor 26. The other terminal of the light is grounded as shown at 28 and it should also be noted that the conductor 14 has a grounded lead as shown at 30 to complete the circuit to the light when the switch 18 is closed.

Figure 1:
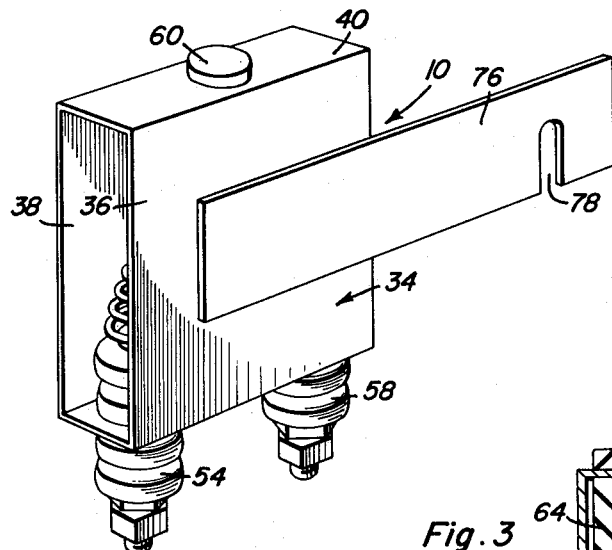
FIGURE 1 is a perspective view of the heating element, its casing and the support to suspend the same within the interior of the automobile door.
Figure 2:
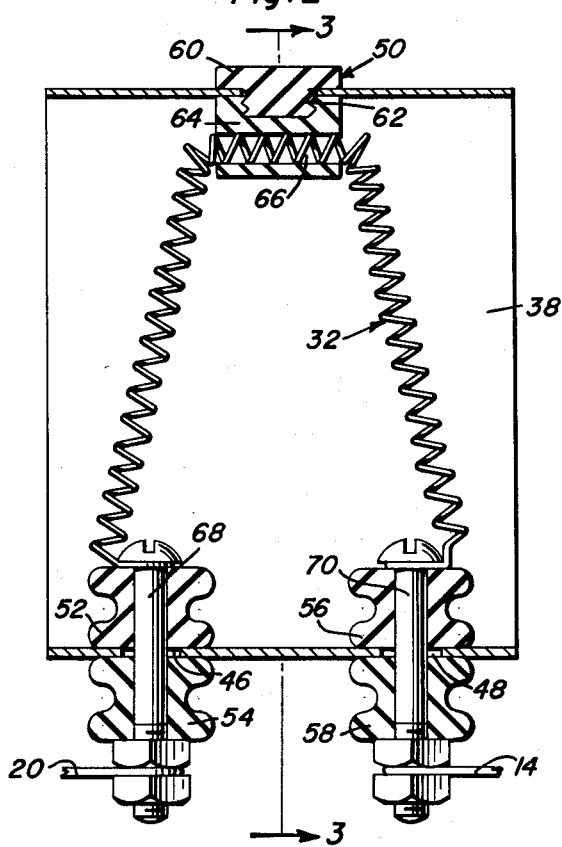
FIGURE 2 is a vertical sectional view through a central longitudinal plane of the heater casing shown in FIGURE 1.
Figure 3:
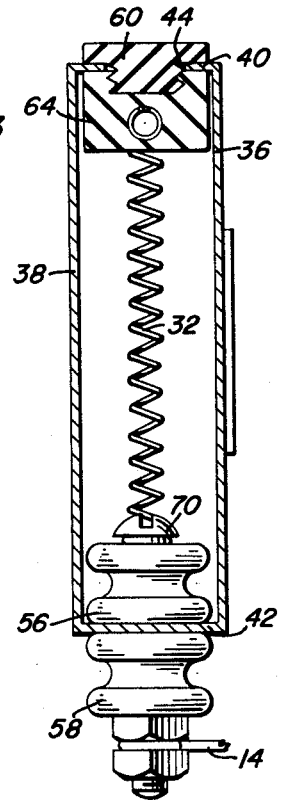
FIGURE 3 is a sectional view taken substantially along the plane 3—3 of FIGURE 2 and illustrates further details of the heating element and its associated mounting structure.

Referring now to FIGURES 1 to 3, a heating element shown by the numeral 32, comprising a high resistance wire or the like is mounted within a casing 34. The casing 34 comprises side walls 36 and 38 and a top and bottom wall 40 and 42. The top wall 40 has an aperture 44 cut therein as does the bottom wall at 46 and 48. Suitable insulators such as 50–58 are adapted to be mounted within the apertures 44, 46 and 48 to support the heating element 32 and its associated contacts which connect the heating element to the circuitry depicted in FIGURE 4. As shown, the insulator 50 mounted within the aperture 44 comprises a portion 60 adapted to seat on the top wall 40 and having a depending lug portion 62 which is threaded to receive the sockets in the upper portion of the insulator 64 whose upper end abuts the bottom of the top wall 40. The lower portion 64 of the insulator 50 has a horizontal bore 66 formed therethrough which receives the central portion of the heating element 32 as shown specifiically in FIGURE 2. The end portions of the heating element 32 are attached to contact bolts 68 and 70 respectively. These bolts extend through the apertures 46, 48 respectively and are surrounded by the insulators 52–58 as shown in FIGURE 2 and mount at their ends remote from their heads the conductors 20 and 14. These conductors are clamped between a pair of nuts on each of the shanks of the bolts as shown in said drawing.

Figure 5:
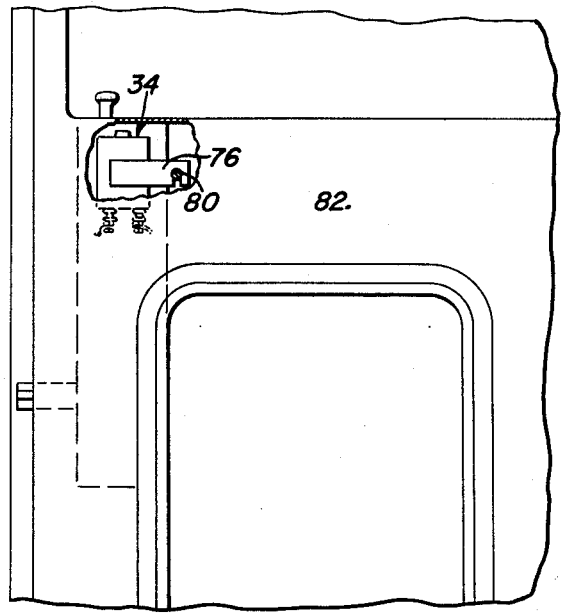
FIGURE 5 is a side view in elevation with certain parts broken away to show the heating element mounting structure of the interior of the automobile door.

The before described heating assembly is adapted to be mounted within the door adjacent the lock 72. More specifically, it is mounted within the framework of said door on the screw or bolt which mounts the door handle 74. To accomplish this an arm 76 is welded or otherwise attached to the side walls 36 of the heater casing 34 and has a slot 78 opening in one side edge of said arm. As shown in FIGURE 5, the slot 78 is adapted to be slid over the shank of the bolt 80 which connects the door handle to the frame 82 of the door of the automobile and when said bolt is tightened the heater is retained in place adjacent the lock 72.

It should thus be apparent that an effective and inexpensive lock heater has been conceived which is adapted to be permanently mounted within an automobile door adjacent the lock to thaw out frozen locks and to keep locks from freezing. If the door lock is frozen, all the operator has to do is to raise the hood of the car and activate the switch 18 if it is a manual switch and wait a few minutes and the lock will thaw. If the switch is thermostatically controlled this will keep the lock from freezing at all times.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination, a vehicle body having a door, a door lock housed within the framework of said door, a door handle secured to said door by a fastener adjacent said door lock, a heater assembly housed within the framework of said door, said heater assembly being adjacent to but separate from and independent of said door lock and in good heat exchange relation with the latter, means for energizing said heater assembly and applying heat from the latter to said door lock and thereby thawing a frozen door lock, said heater assembly including a casing and a heater element housed within and mounted in said casing, support means comprising an arm rigidly connected to and projecting from said casing and engaged by and secured by said door handle fastener.

2. The combination of claim 1 including control means for energizing said heater assembly, said control means being located remote from said door and door lock and exteriorly of said vehicle body.

3. The combination of claim 1 wherein said heater assembly includes an electrically operated heater element, means supplying electric current to said heater element, a control switch controlling the supply of electric current to said electric heater element and located exteriorly of said door.

4. The combination of claim 1 wherein said casing has top, bottom and side walls with open opposite ends, one of said open ends being directed toward said door lock whereby to facilitate heat exchange between said heater element and said door lock.

5. The combination of claim 4 including supports of dielectric material within said casing mounted upon a pair of said walls, said heater assembly including an electric heater element supported upon said dielectric supports and extending across the interior of said casing.

6. The combination of claim 5 wherein one of said dielectric supports has a bore therethrough, said heater element having its mid-portion supported within said bore and its opposite end portions being each secured to one of the other of said dielectric supports.

References Cited by the Examiner

UNITED STATES PATENTS

| | | |
|---|---|---|
| 1,577,193 | 3/26 | Reed. |
| 2,232,577 | 2/41 | West _____ 219—201 X |
| 2,530,513 | 11/50 | Drugan _____ 219—201 |
| 2,538,872 | 1/51 | Jones _____ 219—201 X |
| 2,710,905 | 6/55 | Schramm _____ 219—523 |
| 2,774,855 | 12/58 | Simmons _____ 219—201 X |

FOREIGN PATENTS

| | | |
|---|---|---|
| 908,971 | 10/62 | Great Britain. |
| 1,054,192 | 4/59 | Germany. |

RICHARD M. WOOD, *Primary Examiner.*